United States Patent [19]
Kim

[11] Patent Number: 5,961,826
[45] Date of Patent: Oct. 5, 1999

[54] BIOLOGICAL WASTE WATER TREATMENT SYSTEM HAVING A SEDIMENTATION TANK VERTICALLY COMBINED WITH AN AERATION TANK THEREIN

[76] Inventor: Woon-Chang Kim, 612-701, Eunbit Maul, Goyang-shi, Rep. of Korea, 411-270

[21] Appl. No.: 09/113,234

[22] Filed: Jul. 10, 1998

[30] Foreign Application Priority Data

Jul. 10, 1997 [KR] Rep. of Korea ...................... 97-32115
Jan. 30, 1998 [KR] Rep. of Korea ........................ 98-2557

[51] Int. Cl.⁶ ...................................................... C02F 9/00
[52] U.S. Cl. .................. 210/261; 210/195.1; 210/195.3; 210/202; 210/205
[58] Field of Search .................................... 210/261, 262, 210/195.1, 205, 605, 630, 629, 195.3, 202

[56] References Cited

U.S. PATENT DOCUMENTS

| | | | |
|---|---|---|---|
| 3,872,003 | 3/1975 | Walker | 210/739 |
| 4,874,519 | 10/1989 | Williamson | 210/630 |
| 5,518,618 | 5/1996 | Mulder et al. | 210/629 |
| 5,776,335 | 7/1998 | Overath | 210/195.1 |

FOREIGN PATENT DOCUMENTS 1295-515  2/1984  U.S.S.R. ................ 210/205
WO 92/03386  3/1992  WIPO .

*Primary Examiner*—Jay H. Woo
*Assistant Examiner*—Frank M. Lawrence, Jr.
*Attorney, Agent, or Firm*—Anderson, Kill & Olick, P.C.

[57] ABSTRACT

A waste water treatment system including an anaerobic tank for treating phosphorous contained in initial waste water, a pair of anoxic tanks for treating nitrate in the waste water from the anaerobic tank, a holding tank for containing therein the waste water from an anoxic tank, an aeration tank for treating an organic material contained in waste water from the holding tank by microorganisms and pure oxygen and for treating ammonia by microorganisms to convert the ammonia into nitrate, with the aeration tank being a substantial cylindrical body mounted on a concrete bottom provided with an inclined eccentric slope for causing the waste water to eccentrically flow within the aeration tank, having a diffuser for diffusing compressed air into the waste water in the aeration tank, and a pure oxygen generator, and with the anaerobic tank, the pair of anoxic tanks and the holding tank being mounted around the aeration tank, a sedimentation tank vertically combined with the aeration tank and communicated therewith, with the sedimentation tank having a clarified water outlet, a reversed funnel-shaped guider for guiding the waste water to converge flow lines, a guide baffle mounted inside the reversed funnel-shaped guider, and an outer guider for guiding a flow of waste water having passed the reversed funnel-shaped guider.

6 Claims, 4 Drawing Sheets

BIOLOGICAL WASTE WATER TREATMENT SYSTEM HAVING A SEDIMENTATION TANK VERTICALLY COMBINED WITH AN AERATION TANK THEREIN

FIELD OF THE INVENTION

The present invention relates to a biological waste water treatment system; and, more particularly, to a biological waste water treatment system having a reduced size by vertically combining a sedimentation tank and an aeration tank therein.

DESCRIPTION OF THE PRIOR ART

Conventionally, waste water contaminated with organic materials, e.g., from municipal and industrial sources are either chemically or biologically treated prior to being discharged into a natural water system. In the chemical waste water treatment system, chemicals needed to cause required chemical reactions are thrown into the waste water. The chemical waste water treatment system, though small in size when compared to the biological waste water system, has a major shortcoming in that it is expensive to operate. In the biological waste water treatment system, a sedimentation tank in conjunction with an aeration means, e.g., an aeration tank are widely used in removing the contaminants, especially, organic materials, nitrogen-containing compound and phosphorous from the waste water. In the biological waste water treatment system, there are two types of aerating methods, an open air type and a closed type. In the open air type aeration method, activated sludges from the sedimentation tank and the waste water are mixed with the air in an open air aeration tank. Whereas in the closed type aeration method, activated sludges and the waste water are mixed with oxygen in a closed aeration tank. The biological waste water treatment, though cheaper to operate when compared to the chemical waste water treatment system, has a major disadvantage in that since the sedimentation and aeration tanks are usually separately constructed on the ground, being laterally connected to each other, it requires a large area to accommodate the whole system.

SUMMARY OF THE INVENTION

It is, therefore, a primary object of the invention to provide to a biological waste water treatment system capable of being constructed in a reduced area by vertically combining a sedimentation tank and an aeration tank therein.

The above and other objects of the invention are accomplished by providing a waste water treatment system comprising: an aeration tank for treating organic materials in waste water including microorganisms and oxygen, the aeration tank being a substantial cylindrical body mounted on a concrete bottom and having a waste water inlet through which the waste water is introduced into the cylindrical body; a sedimentation tank located on top of the aeration tank and communicated with said aeration tank through a through-hole, the sedimentation tank having a clarified water outlet through which clarified water is discharged from the sedimentation tank and a means for slowing down a flow of the waste water introduced into the sedimentation tank from the aeration tank; means for diffusing compressed air into the waste water contained in said aeration tank to aerate the waste water; means for re-introducing the waste water in an upper portion of the aeration tank into a lower portion of the aeration tank; and means for supplying oxygen to the waste water to be introduced into the aeration tank.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Figure 1:
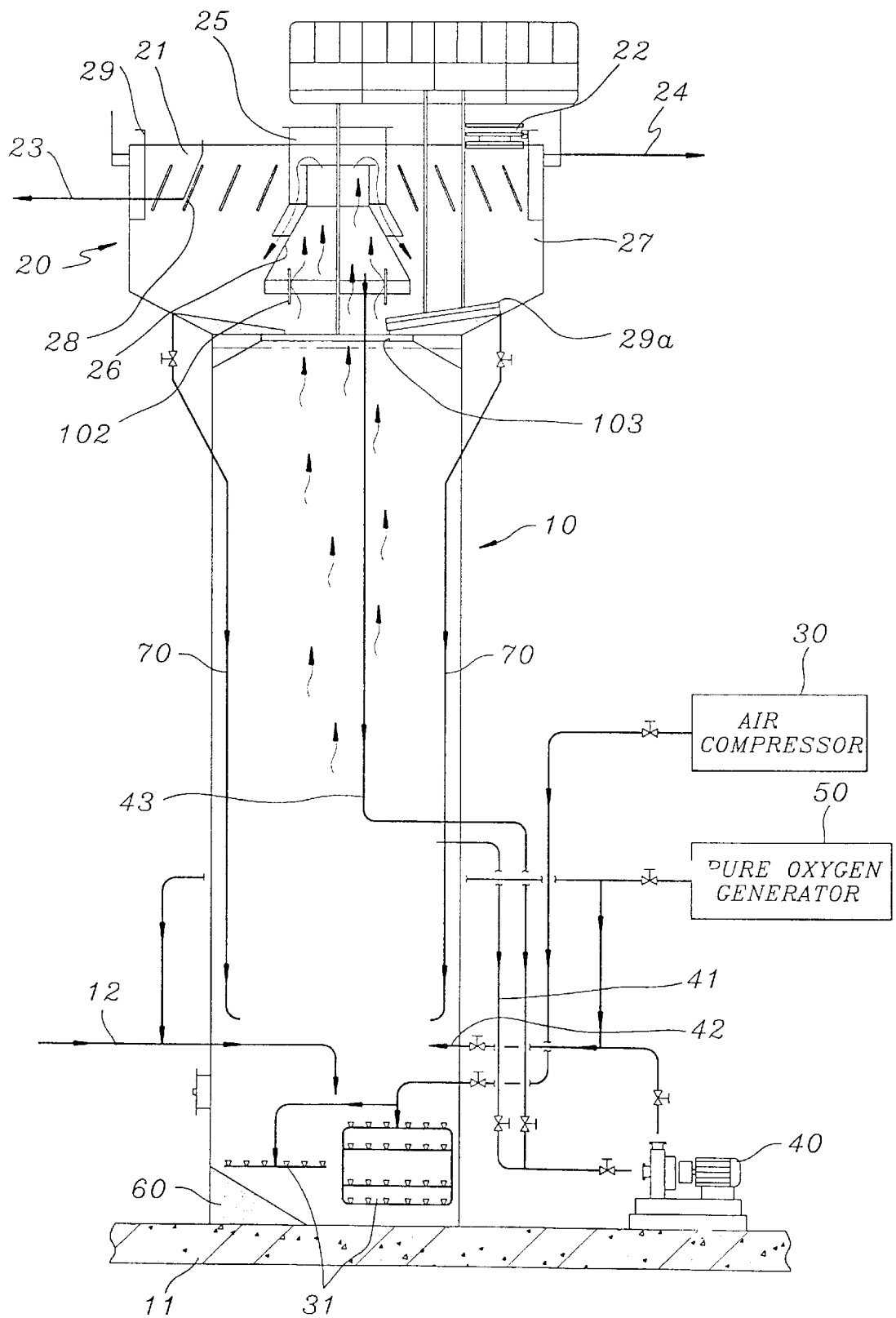
FIG. 1 illustrates a schematic view of a first embodiment of the present invention.

Referring to FIG. 1, there is shown a first embodiment of the inventive biological waste water treatment system specifically designed to remove organic materials from waste water.

Mounted on a concrete bottom 11 is an aeration tank 10 constructed in such a way that its height is larger than its diameter. Within the aeration tank 10, there are microorganisms for treating waste water supplied into the aeration tank 10. The microorganisms that can be used for such purpose are, for example, aerobic bacteria. The waste water to be treated is introduced into the aeration tank 10 through a water inlet 12 formed at a lower portion of the aeration tank 10. A recycling pump 40 is prepared to partially recycle the waste water in such a way that it sucks the waste water from the aeration tank 10 through a first water recycling outlet 41 positioned on a mid portion of the aeration tank 10 and re-introduces the same into the aeration tank 10 through a water recycling inlet 42 formed through the aeration tank 10 in a substantially same vertical position as that of the water inlet 12. Further, the waste water may be recycled between the water recycling inlet 42 and a second water recycling outlet 43 whose one end terminates nearby a funnel-shaped guide 26. Therefore, the recycled waste water may be selectively supplied through either one of the first water recycling outlet 41 and the second water recycling outlet 43, or through both of the water recycling outlets 41 and 43.

The waste water is aerated with compressed air and pure oxygen to be consumed by the biological oxidation. Through a diffuser 31 built at a bottom of the aeration tank 10, the compressed air is upwardly spouted into the waste water. The pure oxygen is supplied into the aeration tank 10 by a pure oxygen generator 50; and the compressed air is supplied by an air compressor 30. The pure oxygen generator 50 is connected to both the water inlet 12 and the water recycling inlet 42 so that the waste water containing the oxygen is continuously introduced into the aeration tank 10. In accordance with the present invention, the pure oxygen generator 50 supplies about 90% of the oxygen to be consumed by the biological oxidation and the remaining 10% of the oxygen is delivered by the compressed air from the air compressor 30. It should be further noted that the aeration by the air and the oxygen agitates the waste water within the aeration tank 10, allowing the oxygen is easily delivered to the microorganisms for their consumption.

In order to increase an aeration efficiency by the compressed air and the pure oxygen, an eccentric slope 60 is formed on a lower bottom corner of the aeration tank 10. The eccentric slope 60 causes the waste water to eccentrically flow within the aeration tank 10, thereby facilitating the agitation of the waste water, reducing non-aerated section within the aeration tank 10. As a result, a greater amount of the oxygen can be efficiently delivered to the microorganisms. As a modification of the diffuser 60, it may be installed to be inclined with respect to the bottom of the aeration tank 10 in order to further reduce the non-aerated section. On the other hand, the recycling of the waste water by the recycling pump 40 also increases the aeration efficiency. In the configuration described above, the pure oxygen, the air and the microorganisms are well mixed in the waste water flowing within the aeration tank 10; and as a consequence of the microorganisms metabolizing, the organic materials contained in the waste water is decomposed into byproducts, e.g., bacterial cells, carbon dioxide and water.

The aeration tank 10 i s vertically communicated with a sedimentation tank 20 positioned on top thereof through a through-hole 103 as indicated with a dotted line. In the sedimentation tank 20, the byproducts in the waste water are re moved from the waste water. In the present invention, since the sedimentation tank 20 and the aeration tank 10 are vertically communicated with each other, when the waste water is introduced into the sedimentation tank 20 from the aeration tank 10, a flow of the waste water become more turbulent due to the aeration effect of the compressed air and the pure oxygen caused by the air and/or the oxygen turning into bubbles and naturally accelerating upward. Accordingly, devices are required to turn the turbulent flow of the waste water to a laminar flow, then, to a non-flow state. For this purpose, the funnel-shaped guider 26 which has a general reversed funnel-shaped configuration, a guide baffle 102 mounted inside the funnel-shaped guider 26 and an outer guider 25 which has a larger diameter than that of the funnel-shaped guider 26 are prepared within the sedimentation tank 20.

The waste water introduced into the sedimentation tank 20 first passes through the funnel-shaped guider 26, as indicated with arrows in FIG. 1. By the funnel-shaped guider 26, the flow line of the waste water converges toward a center line of the sedimentation tank 20. After having passed through the funnel-shaped guider 26, the waste water overflows and reaches the outer guider 25 to downwardly flow toward a bottom and a lateral wall of the sedimentation tank 20, being guided by an external surface of the funnel-shaped guider 26 and an internal surface of the outer guider 25. During passing between the funnel-shaped guider 26 and the outer guider 25, the flow of the waste water progressively turns more laminar. As a result, the byproducts having a higher specific gravity sink to the bottom of the sedimentation tank 20 and forming a sediment and the remainders of the byproducts upwardly flow to be separated from the waste water by a plurality of slanted plates 28, a baffle 29, a skimmer 22, a scum tank 21 and a scraper 29a. A guide baffle 102 is formed in the funnel-shaped guider 26 to reduce a direct introduction of the air into the sedimentation tank 20 from the diffuser 31.

The plurality of slanted plates 28 aid the byproducts to sink to the bottom to form the sediment. The skimmer 22 serves to skims scums floating on a surface of the waste water. The scums are collected in the scum tank 21 and are discharged through a scum outlet 23 formed through the scum tank 21.

Sludges at the bottom of the sedimentation tank 20 contains the microorganisms for treating the waste water. For this reason, the sludge nearby the scraper 29a are send back to a lower portion of the aeration tank 10 for a recycling of the microorganisms between the aeration tank 10 and the sedimentation tank 20 through a returning tube 70. Some of the sludge are returned to the aeration tank 10 through the through-hole 103.

On the other hand, clarified water is discharged from the sedimentation tank 20 through an water outlet 24.

Figure 2:
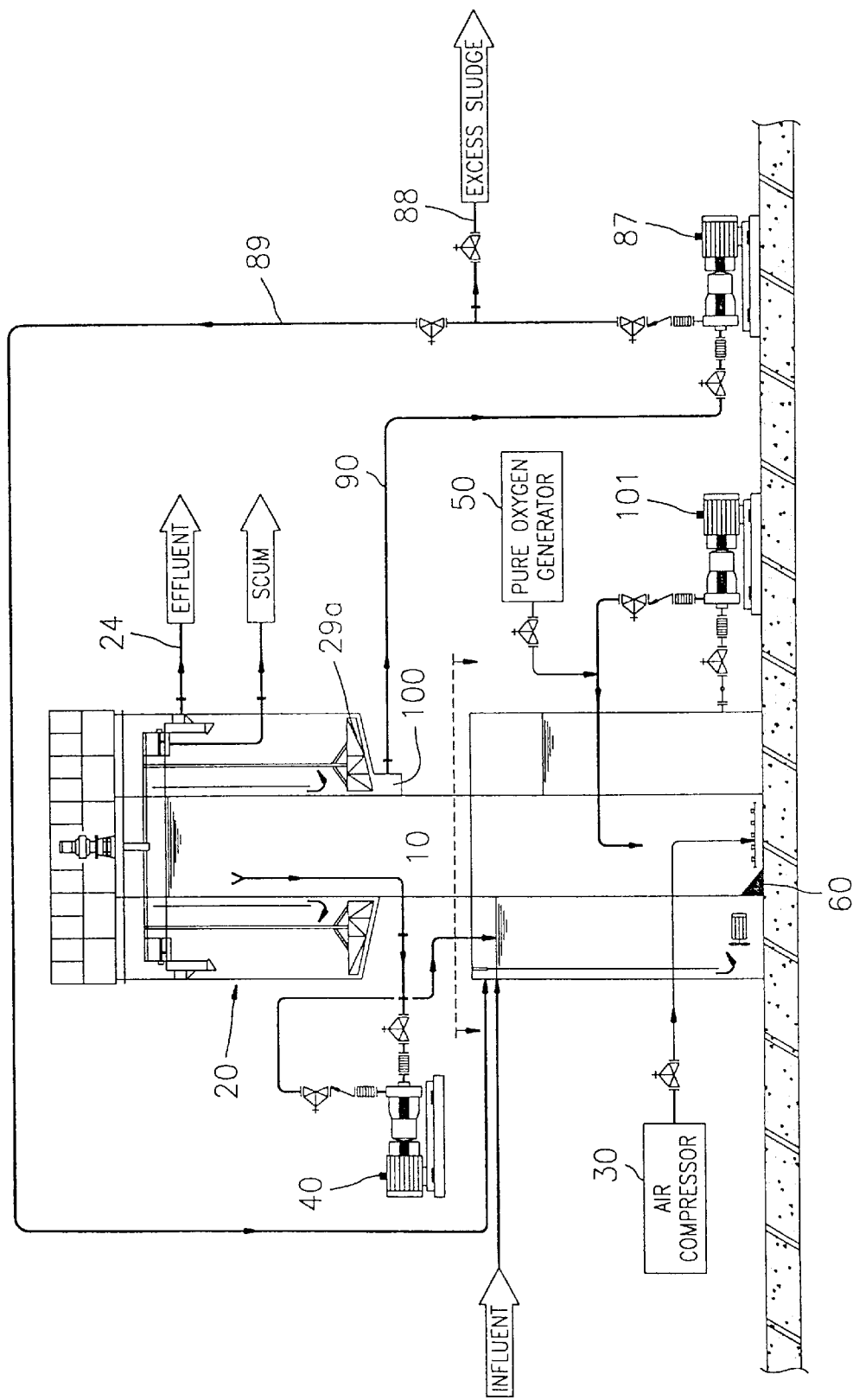
FIG. 2 shows a schematic view of a second embodiment of the present invention.
Figure 3:
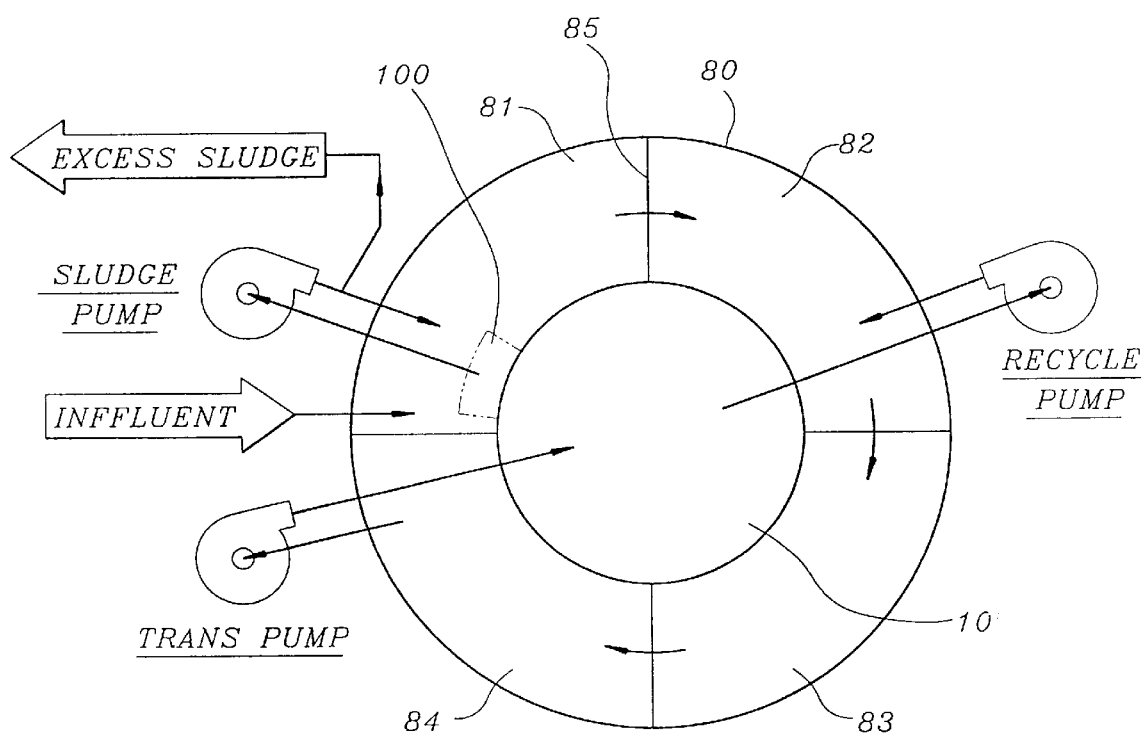
FIG. 3 offers a schematic top plan view of the present invention.
Figure 4:
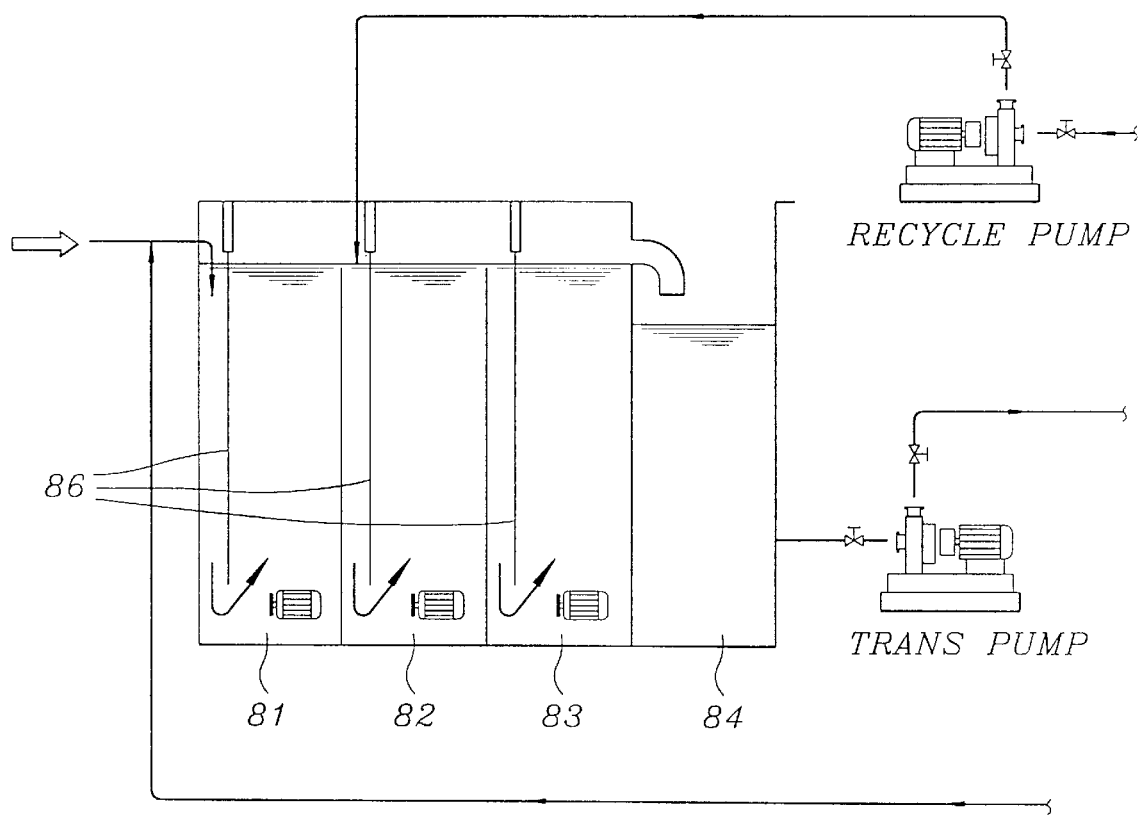
FIG. 4 describes a schematic view showing an anaerobic tank, a first anoxic tank, a second anoxic tank and a holding tank.

Referring to FIGS. 2 to 4, there is shown a second embodiment of the present invention. In the second embodiment, the inventive waste water treatment system is constructed to additionally remove ammonia nitrogen and phosphorous as well as the organic materials. The organic materials are removed in a same manner as in the first embodiment. In a description of the second embodiment, same reference numerals will be used to represent same components in FIG. 1.

For treating the ammonia nitrogen and the phosphorous, an anaerobic tank 81, a first anoxic tank 82, a second anoxic tank 83 and a holding tank 84 are additionally mounted around the aeration tank 10 to surround the same, according to the present invention. As shown in FIGS. 3 and 4, these four tanks 81 to 84 are defined with an external wall 80, an internal wall 86, four partitions 85. The internal wall 86 serves to partially separate each of the four tanks 81 to 84 into an inlet part and an outlet part to generate the flow of the waste water within each of the tanks 81 to 84.

The waste water to be treated is first introduced into an upper portion of the anaerobic tank 81 to be treated by anaerobic microorganisms which are introduced into the anaerobic tank 81 when the recycled sludges are introduced thereinto. That is, whenever the sludge is discharged from a sludge pit 100 through a sludge outlet tube 90 and re-introduced into the anaerobic tank 81 through a sludge inlet tube 89 for the recycling purpose, the anaerobic microorganisms contained in the sludge are also introduced into the anaerobic tank 81 through the sludge inlet tube 89. The recycling of the sludge is made by a sludge pump 87. During the recycle process of the sludges, excessive sludge are discharged from the treating line through a sludge discharge tube 88. In the anaerobic tank 81, the phosphorous components in the waste water are removed from the waste water as byproducts of the anaerobic microorganisms metabolizing.

As shown in FIG. 4, when the waste water overflows the anaerobic tank 81, it moves to the first anoxic tank 82 and then the second anoxic tank 83. Further, the waste water in the upper portion of the aeration tank 10 is also re-introduced into the first anoxic tank 82 by the recycle pump 40. The waste water from the upper portion of the aeration tank 10 contains much nitrate nitrogen, since ammonia nitrogen contained in initial waste water is oxidized to nitrate nitrogen in the aeration tank 10. In the anoxic tanks 82 and 83, the nitrate nitrogen is treated by denitrification microorganisms, thereby removing nitrogen as a gaseous state from the waste water.

The waste water treated in the anoxic tanks 82 and 83 is delivered to the aeration tank 10 by a trans pump 101 through the holding tank 84. As described above, in the aeration tank 10, ammonia nitrogen is oxidized to the nitrate nitrogen.

In accordance with the present invention, this system enables more than 95% as BOD loading to be treated due to a high oxygen transfer ratio to the microorganisms for treating the waste water and an efficient sedimentation.

Furthermore, treatment efficiency is maximized as a result of a rapid mixing of organic waste water and microbe and high oxygen dissolution. Furthermore, in accordance with the present invention, since the sedimentation tank and the aeration tank are vertically combined instead of horizontally combined, the total area required to construct the whole system is reduced. thereon.

Although the invention has been shown and described with respect to the preferred embodiments, it will be understood by those skilled in the art that various changes and modifications may be made without departing from the spirit and scope of the invention as defined in the following claims.

What is claimed is:

1. A waste water treatment system comprising:

an anaerobic tank for treating phosphorous, which is contained in waste water and introduced into the anaerobic tank by anaerobic microorganisms;

a first anoxic tank and a second anoxic tank for treating nitrate contained in the waste water from the anaerobic tank by denitrification microorganisms;

a holding tank for containing therein the waste water from the second anoxic tank;

an aeration tank for treating an organic material contained in waste water from the holding tank by microorganisms and pure oxygen and for treating ammonia by microorganisms to turn ammonia into the nitrate, the aeration tank being a substantial cylindrical body mounted on a concrete bottom provided with an inclined eccentric slope formed thereon for causing the waste water to eccentrically flow within the aeration tank, the aeration tank having a diffuser for diffusing compressed air into the waste water contained in said aeration tank, and means for supplying pure oxygen to the waste water in the aeration tank, wherein the anaerobic tank, the pair of anoxic tanks and the holding tank are mounted around the aeration tank to surround the aeration tank with substantially identical height with one another;

a sedimentation tank vertically combined with an upside of the aeration tank and communicated with said aeration tank through a through-hole, the sedimentation tank having a clarified water outlet through which clarified water is discharged from the sedimentation tank, the sedimentation tank having a sludge pit;

means for slowing down the flow of the waste water introduced into the sedimentation tank from the aeration tank, the slowing-down means including a reversed funnel-shaped guider for guiding the flow of the waste water introduced into the sedimentation tank to converge flow lines of the waste water to a central line of the sedimentation tank, the reversed funnel-shaped guider having a guide baffle mounted inside the reversed funnel-shaped guider, and an outer guider for guiding a flow of the waste water having passed the reversed funnel-shaped guider to allow the waste water to flow between an external surface of the reversed funnel-shaped guider and an internal surface of the outer guider, the outer guider having a larger diameter than the reversed funnel-shaped guider;

means for re-introducing the waste water in an upper portion of the aeration tank into the first anoxic tank; and means for re-introducing sludge in said sedimentation tank to the anaerobic tank.

2. The waste water treatment system of claim 1, further comprising means for re-introducing the waste water from the sedimentation tank into the aeration tank.

3. The waste water treatment system of claim 1, wherein said means for re-introducing the waste water in the upper portion of the aeration tank into the first anoxic tank comprises:

a first water recycling outlet whose one end terminates nearby the funnel-shaped guide; and a recycling pump for delivering the waste water from the first water recycling outlet to the first anoxic tank.

4. The waste water treatment system of claim 2, wherein said means for re-introducing the waste water from the sedimentation tank into the aeration tank comprises:

a second water recycling outlet positioned on the sedimentation tank; and a recycling pump for delivering the waste water from the second water recycling outlet to the aeration tank.

5. The waste water treatment system of claim 1, wherein said means for supplying pure oxygen to the waste water in the aeration tank is of an oxygen generator for generating the pure oxygen to deliver the pure oxygen into the aeration tank.

6. The waste water treatment system of claim 1, wherein said means for re-introducing sludge in said sedimentation tank to the anaerobic tank comprises:

a sludge outlet tube connected to said sludge pit; and a sludge pump for delivering the sludge from said sludge pit to the anaerobic tank through the sludge outlet tube.

* * * * *